United States Patent [19]

Lipa et al.

[11] Patent Number: 5,209,896
[45] Date of Patent: May 11, 1993

[54] HEAT SHIELD

[75] Inventors: Manfred Lipa, Venelles; Claude Deck; Pierre Deschamps, both of Aix en Provence, all of France

[73] Assignee: Commissariat a l'Energie Atomique, Paris, France

[21] Appl. No.: 674,583

[22] Filed: Mar. 25, 1991

[30] Foreign Application Priority Data

Mar. 30, 1990 [FR] France .................. 90 04108

[51] Int. Cl.$^5$ ............................................. G21C 11/08
[52] U.S. Cl. ........................ 376/289; 376/287; 376/136; 376/146; 376/150; 52/506; 52/508; 52/509; 244/158 A; 244/132; 403/378; 403/379; 403/405.1; 403/406.1
[58] Field of Search .............. 376/136, 150, 146, 287, 376/288, 289; 52/506, 508, 509; 403/406.1, 405.1, 378, 379; 244/132, 158 A; 976/DIG. 152-165

[56] References Cited

U.S. PATENT DOCUMENTS

| | | |
|---|---|---|
| 1,574,946 | 3/1926 | Stevens . |
| 3,023,545 | 3/1962 | Hosbein .................. 50/331 |
| 3,720,581 | 3/1973 | Kaser ........................ 176/87 |
| 3,979,866 | 9/1976 | Prescott .................... 52/249 |
| 4,012,879 | 3/1977 | Aubert et al. ............ 52/508 |
| 4,673,548 | 6/1987 | Betts, Jr. et al. ......... 376/362 |
| 4,849,158 | 7/1989 | Meuschke et al. ....... 376/285 |
| 5,078,529 | 1/1992 | Moulton .................... 403/24 |

FOREIGN PATENT DOCUMENTS 2040415 8/1980 United Kingdom .

OTHER PUBLICATIONS

McKelvey, T. E. and E. R. Johnson "Doublet III Vessel Wall Protection for 7 mw Neutral Beam Heated Plasma Operation", 9th Symposium on Engineering Problems of Fusion Research, Chicago, Ill., Oct. 1981, pp. 1650–1653.

*Primary Examiner*—Donald P. Walsh
*Assistant Examiner*—Chrisman D. Carroll
*Attorney, Agent, or Firm*—Hayes, Soloway, Hennessey & Hage

[57] ABSTRACT

The heat shield according to the invention makes it possible to protect a structure from a very high thermal flux. It is mainly constituted by tiles (2) fixed to a support structure (4) by means of a spring (8) fixed in translation with respect to a tile (2) and on which bears a locking arm (10). The latter can be fixed to the support structure (4) by means of locking screws (30), which are accessible from the outside through locking orifices (12) in the tile (2). The compression of the spring (8) allows locking to take place and also a satisfactory heat exchange from the tile (2) to the support structure (4), which can be cooled by cooling medium flow ducts (14).

5 Claims, 4 Drawing Sheets

HEAT SHIELD

FIELD OF THE INVENTION

The field of the invention is the protection of structures against very high, continuous thermal fluxes of approximately 100 W/cm$^2$. This type of protection is more particularly used in thermonuclear reactors and in very high temperature furnaces.

PRIOR ART

Various types of heat shield have already been developed and used tiles as protective elements.

A first heat shield type uses round tiles which, as a result of their circular shape, suffer from the main disadvantage of not completely covering the wall to be protected.

A second heat shield type uses tiles, whose means for fixing the wall to be protected to the bearing structure terminate at the outer surface of the tile and are therefore exposed to the thermal flux.

A third heat shield type uses tiles having in each case a fixed base member shaped like a hook and whose installation requires a translatory movement of the said tile, which complicates installation and leads to an irregular contact and consequently to a poor heat transfer between the tiles and its support.

The aim of the invention is to propose a heat shield not suffering from the disadvantages of the various heat shield types referred to hereinbefore.

SUMMARY OF THE INVENTION

To this end, the invention relates to a heat shield mainly constituted by a support structure made from a good heat conducting material and cooled by an internal circulation of a cooling fluid, parallelepipedic protective tiles made from a material resistant to high temperatures and a shaping or conformation layer locked between each tile and the support structure via elastic fixing means.

This heat shield is characterized in that the elastic fixing means comprise for each tile a tie rod fixed by a first end in the rear face of the tile, a plate spring fixed in its centre perpendicularly to the second end of the tie rod and a mobile locking arm sliding around the tie rod between the spring and the tile and having at each end a bearing surface on which respectively abut each of the ends of the plate spring, tensioned by locking means.

The said locking means are preferably constituted by two locking screws, screwed in the support structure and whose two heads respectively bear on the two ends of the locking arm facing the rear face of the tile, each head being accessible by the front face of the tile through a small diameter locking orifice.

In order to permit the insertion of the elastic fixing means in the support structure, on the contact surface of said support structure is provided a longitudinal channel into which issue the fixing holes, in order to receive the locking arm and within whose interior can be engaged said locking arm under the action of the locking screws in order to act on the plate spring, after the rear face of the tile has been contacted with the shaping layer deposited on the support structure.

A functioning condition for the elastic fixing means of the heat shield according to the invention is that, in the inoperative state, the distance separating the rear face of the tile from the underlying face of each end of the locking arm is less than the depth of the longitudinal channel, so as to permit the compression of the spring necessary for locking the shaping layer between the tile and the support structure.

In the case where the support structure has parallel cooling medium ducts, the longitudinal channel of the support structure is parallel to said ducts.

LIST OF DRAWINGS

The invention and its various features will be better understood from reading the following illustrative and non-limitative description and with reference to the attached drawings, wherein show:

FIG. 1 a tile and means for fixing it in the support structure according to the invention.

FIGS. 2A two sections showing the installation of the tile of FIGS. 1 on and 2B the support structure.

FIGS. 3A side views with sections of FIGS. 2A and 2B. and 3B

FIG. 4 a perspective view plan of the bearing structure used in the invention and serving to receive several tiles.

DETAILED DESCRIPTION OF AN EMBODIMENT OF THE INVENTION

The tiles of the heat shield according to the invention are exposed by their front face to the thermal flux with respect to which it is necessary to protect certain elements of an installation. Thus, such a shield protects certain components of a thermonuclear reactor against the thermal radiation of the plasma.

Figure 1:
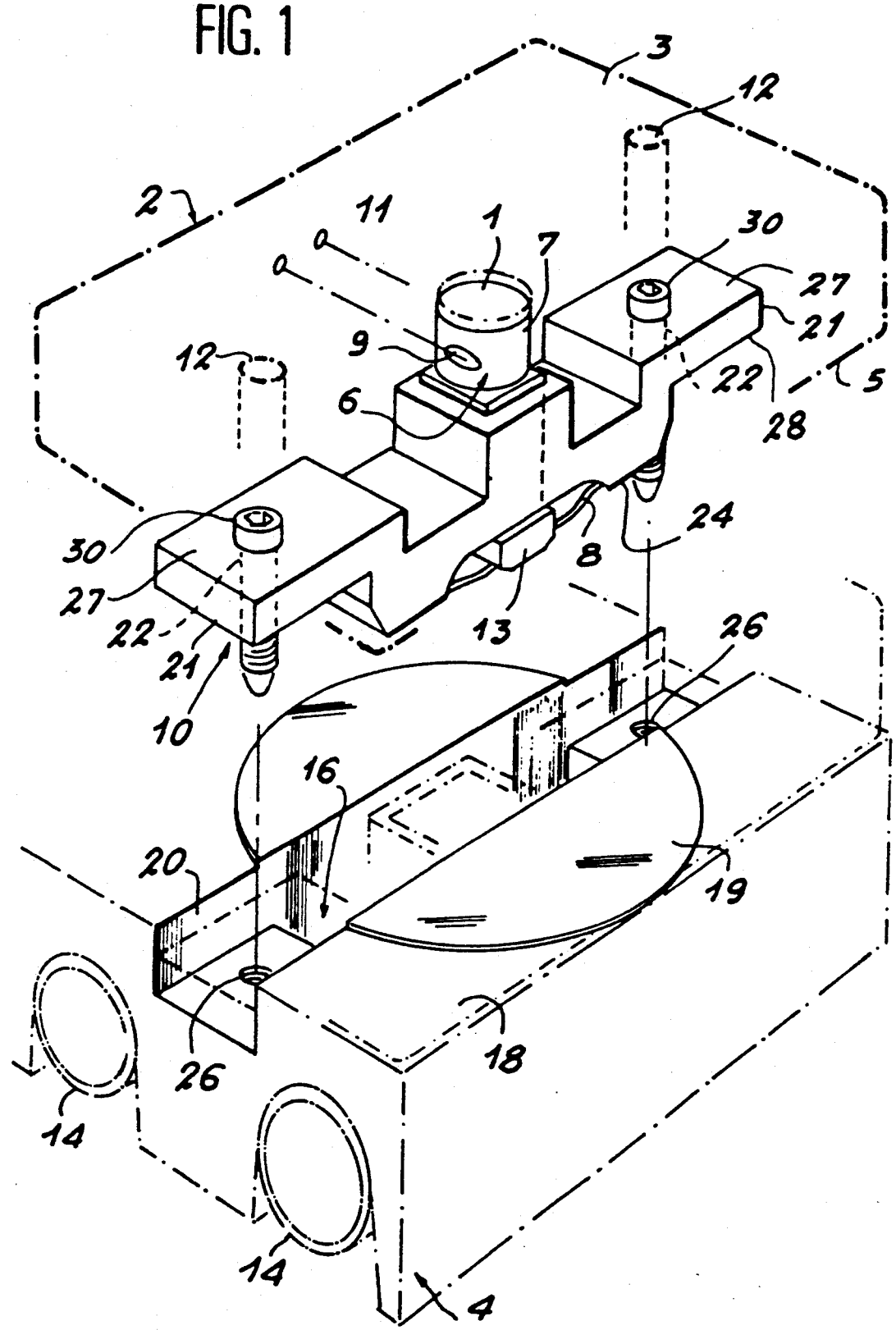

The shield mainly comprises tiles fixed to a support structure, FIG. 1 showing one of the said tiles with its means for fixing to the support structure.

The protective tile 2, directly exposed to the thermal flux, is made from a material resistant to high temperatures, such as graphite, refractory materials or composites. It has a parallelepipedic shape making it possible to completely cover a support. Preferably, said shape is rectangular. At least two small diameter locking orifices 12 are made through the tile 2 to permit the subsequent passage of tools intended for the locking of the tile to the support structure via fixing means. A bore 1 is provided on the rear face 5, i.e. the face not exposed to the thermal flux and perpendicular to the tile 2, in order to receive a tie rod 6 for fixing said tile 2. One way of locking said tie rod 6 in translation in the bore 1 consists of making at least one hole in the tile 2, perpendicular and tangential to the bore 1, so that a locking pin 11 can be introduced into the same. In this case, the tie rod 6 has a channel corresponding to the pin 11.

The support structure 4 to which is fixed the tile 2 is represented at the bottom of FIG. 1 by one of its elements. This support structure is constituted by longitudinal blocks traversed by ducts 14 in which circulate a cooling fluid. These ducts are preferably parallel to one another and have an outer surface with a large contact with the support structure 4 with a view to ensuring a good removal of the calories transferred by the tile 2 to the support structure 4 via the shaping layer 19. A longitudinal channel 20 is provided on the contact surface 18 of the support structure 4 in order to form a housing for the elastic fixing means for the tile 2. This longitudinal channel 20 is preferably positioned between two cooling ducts 14.

The support structure 4 is made from a good heat conducting material, such as copper or aluminium. The cooling fluid circulating in the ducts 14 can be water, air, etc. The duct 14 can be constituted by tubes having a circular or random section, but made from a good heat conducting material.

As shown in FIG. 1, the elastic fixing means are constituted by the tie rod 6 fixed by a first end 7 in the bore 1 of the tile 2 on the side of the rear face 5 of the latter. The elastic fixing means are completed by a plate spring 8 fixed to the second end 13 of the tie rod 6. The spring 8 extends perpendicularly of each side of the tie rod 6 by two arms of the same length. It is generally of the multiplate type and is made from a heat resisting material, such as nickel bearing alloys such as INCONEL available from International Nickel Co., and NIMONIC available from Mond Nickel Company.

A mobile locking arm 10 is mounted in sliding manner around the tie rod 6. The said arm is terminated by two ends 21, each having a smooth hole 22. The centre-to-centre distance of these two smooth holes 22 corresponds to the centre-to-centre distance of the two locking orifices 12 of the tile 2. This locking arm 10 has two first bearing surfaces 24 against which abut the two ends of the platespring 8. The thickness of the ends 21 of the locking arm 10 is much less than the depth of the longitudinal channel 20 of the support structure 4 in which the locking arm is located during the installation of the tile 2 and its fixing means.

The elastic fixing means comprise means for tensioning the spring 8. The latter are preferably constituted by locking screws placed in the smooth holes 22 of the locking arm 10 and whose thread corresponds to the tapping of the fixing holes 26 made in the support structure 4. Tapped holes 26 are made in the support structure 4 at the bottom of the longitudinal channel 20. Their centre-to-centre distance corresponds to that of the locking orifices 12 of the tile 2. The locking screws 30 act by their heads on the bearing surface 27 opposite to the bearing surface 28 of the locking arms 10.

The support structure contact surface 18 is completed by a conformation or shaping layer 19 for optimizing the heat transfer by conduction between the tile 2 and the support structure 4. This shaping layer 19 can be made from a material such as flexible graphite flakes such as PAPYEX available from Carbonne Lorraine, a metal fabric or the like.

This description of the elastic fixing means constitutes an exemplified embodiment.

Thus, the concept of fixing the tile 2 to the support structure 4 is as follows. The elastic fixing means are fixed in the tile 2 by the rear face 5 of the latter, the locking deformation taking place perpendicularly to the tile 2. The locking orifices 12 give access to the heads of the locking screws 30 and control with the aid of an appropriate spanner the approach of the locking arm 10 to the support structure 4. Therefore the spring 8 is taut and applies the tile 2 to the support structure 4. This installation will be better explained hereinafter in connection with FIGS. 2A and 2B.

Figure 2:
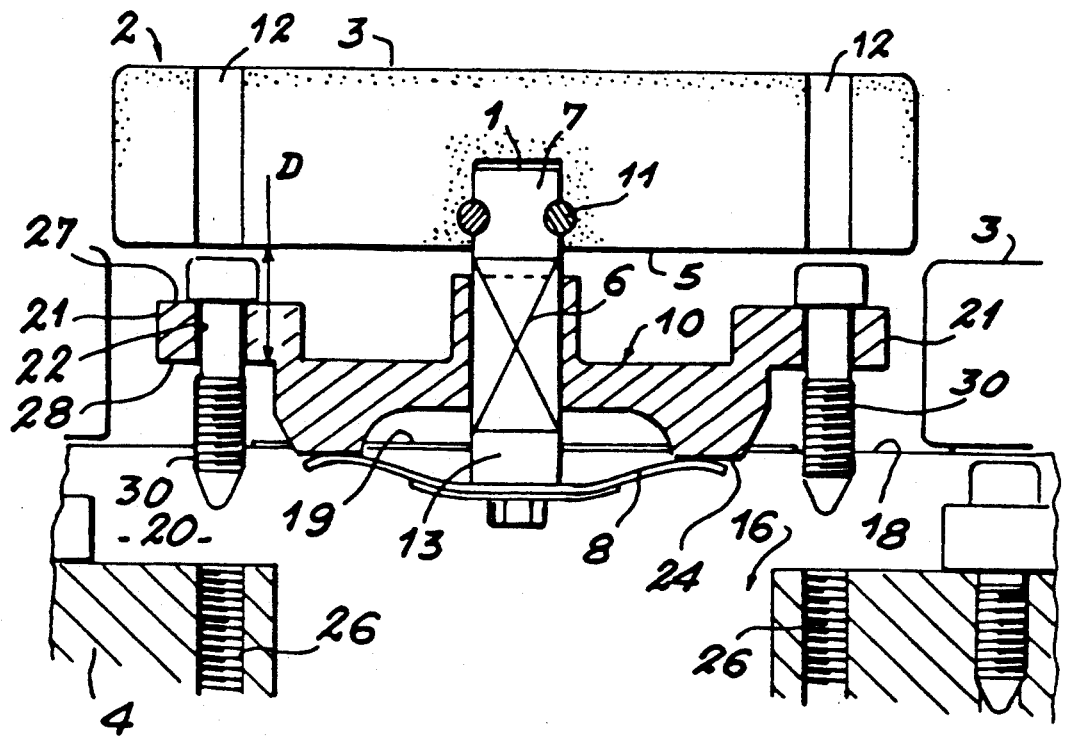
Figure 2:
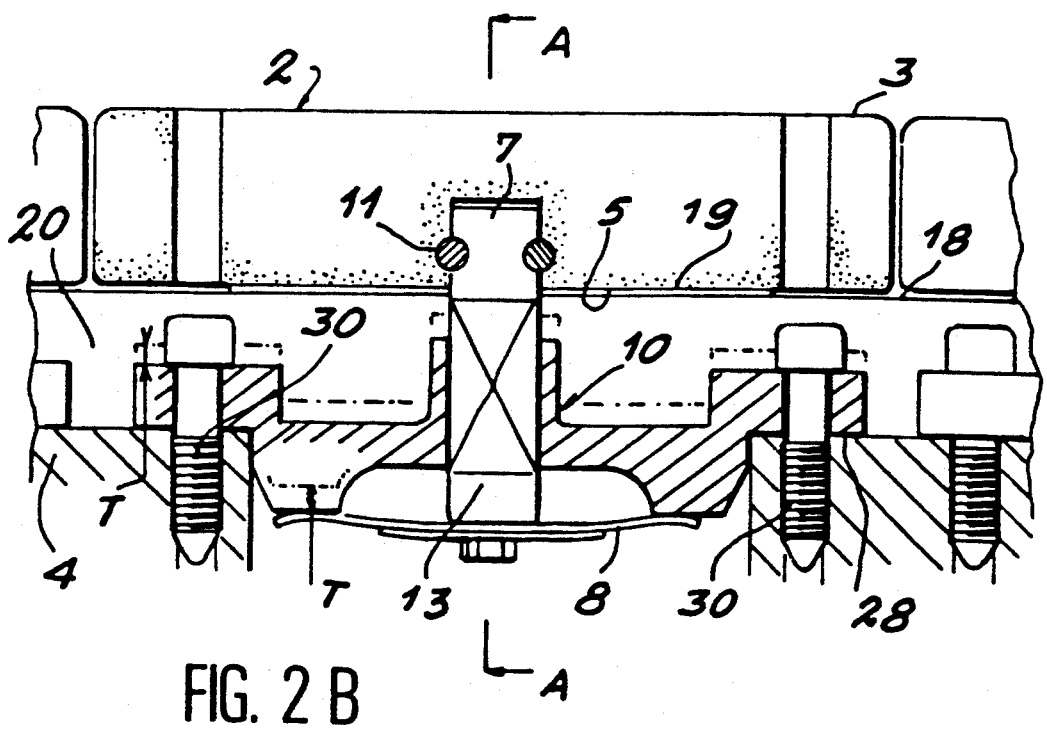

FIG. 2A shows a tile 2 positioned facing the location where it is to be fixed to the support structure 4, in the present case between four other tiles. The elastic fixing means constituted by the tie rod 6, the spring 8 and the locking arm 10 are already in place on the rear face of the tile, the heads of the locking screws 30 being positioned facing the locking orifices 12 of the tile 2 and the threaded part of said screws 30 is placed in the axis of the tapped holes 26 of the support structure 4. The spring 8 is relaxed. Its two ends support the locking arm 10.

The heads of the locking screws 30 are Allen screws, so that they can be screwed through the locking orifices 12 by means of appropriate spanners. During their screwing into the tapped holes 26, the locking screws 30 move the assembly constituted by the tile 2 and its elastic fixing means. During the locking action, by its rear face 5 the tile 2 comes into contact with the shaping layer deposited on the support structure 4. If locking continues the tile 2 and the tie rod 6 remain stationary, but the locking arm 10 is moved more deeply into the channel 20 by the locking screws 30 by sliding around the tie rod 6, which has the effect of tensioning the spring 8 in the manner shown in FIG. 2B. The sag undergone by the ends of the plate spring 8 corresponds to the translation T of the ends 21 of the locking arm 10 towards the support structure 4 once the said tile 2 is in contact with the latter. This amounts to saying that the distance D in the inoperative state, separating the bearing surfaces 28 from the ends 21 of the locking arm 10 placed facing the shaping layer 19 deposited on the support structure 4 on the rear face 5 of the tile 2, must be less than the depth of the longitudinal channel 20.

Therefore the installation of such a tile 2 can take place by positioning the locking arm 10 in the channel 20 and then by screwing the locking screws 30 by means of a bent spanner for Allen screws and which is introduced into the locking orifices 12 of the tile 2. This locking action must continue until the bending of the plate spring 8 is such that it applies an adequate locking force of the tile 2 to the shaping layer of the support structure 4, thus making it possible to obtain a very good heat transfer by conduction from the tile 2 to the support structure 4.

Figure 3:
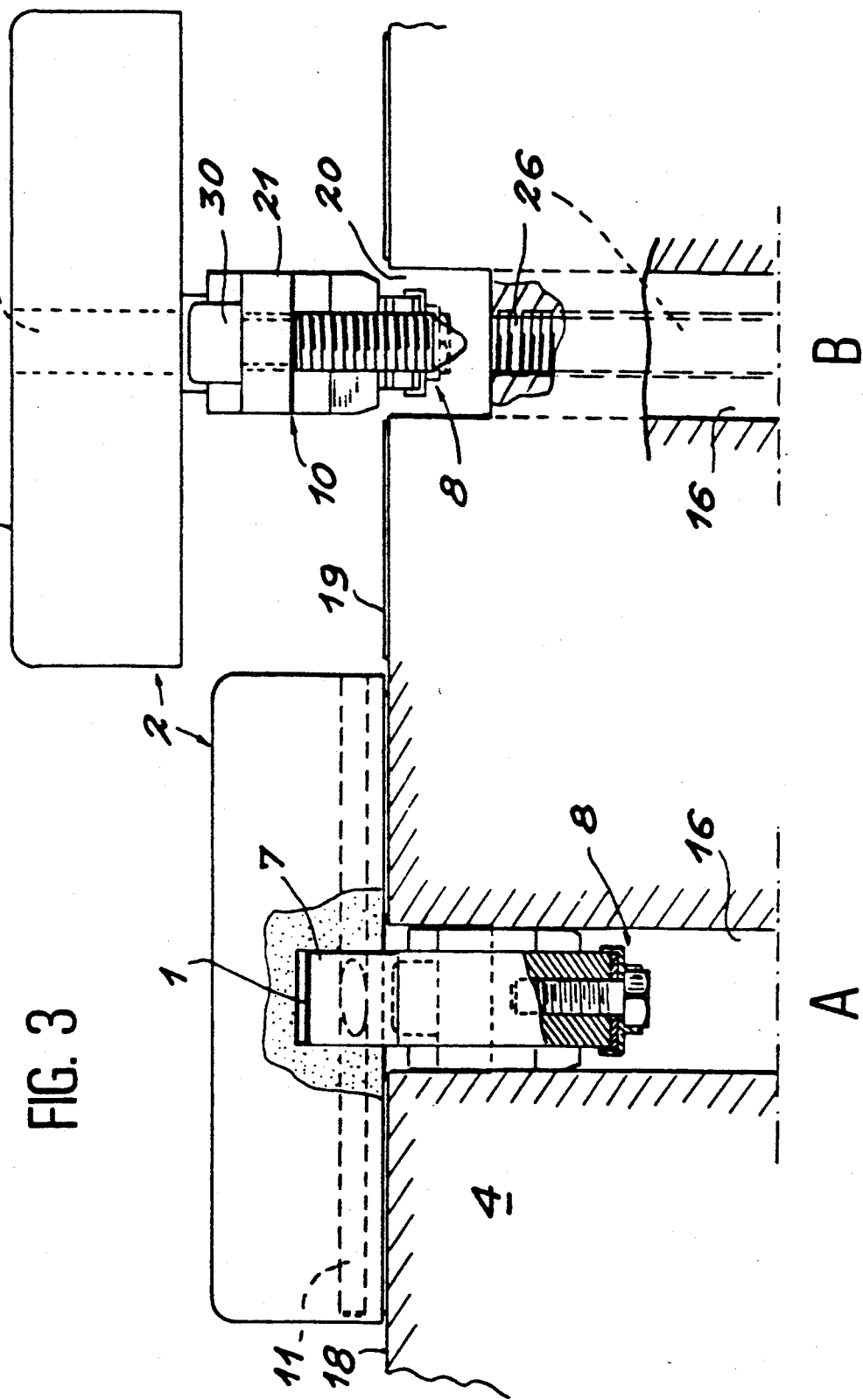

The installation of a tile 2 is also illustrated by FIGS. 3A and 3B, which should be considered in respective correspondence with FIGS. 2A and 2B.

In the side view of FIG. 3A, the channel 20 has a profile corresponding to the ends of the locking arm 10, i.e. the width of said longitudinal channel 20 slightly exceeds the width of the locking arm 10.

FIG. 3B, which is a section along line A—A of FIG. 2B, the tile 2 and its elastic fixing means being fixed to the support structure 4. It can be seen that the longitudinal channel 20 has a greater depth in the centre of the fixing means and level with the fixing holes 26. It would also be possible for the support structure 4 to be completely traversed in the central part 16 of the channel 20 between the fixing holes 26.

Figure 4:
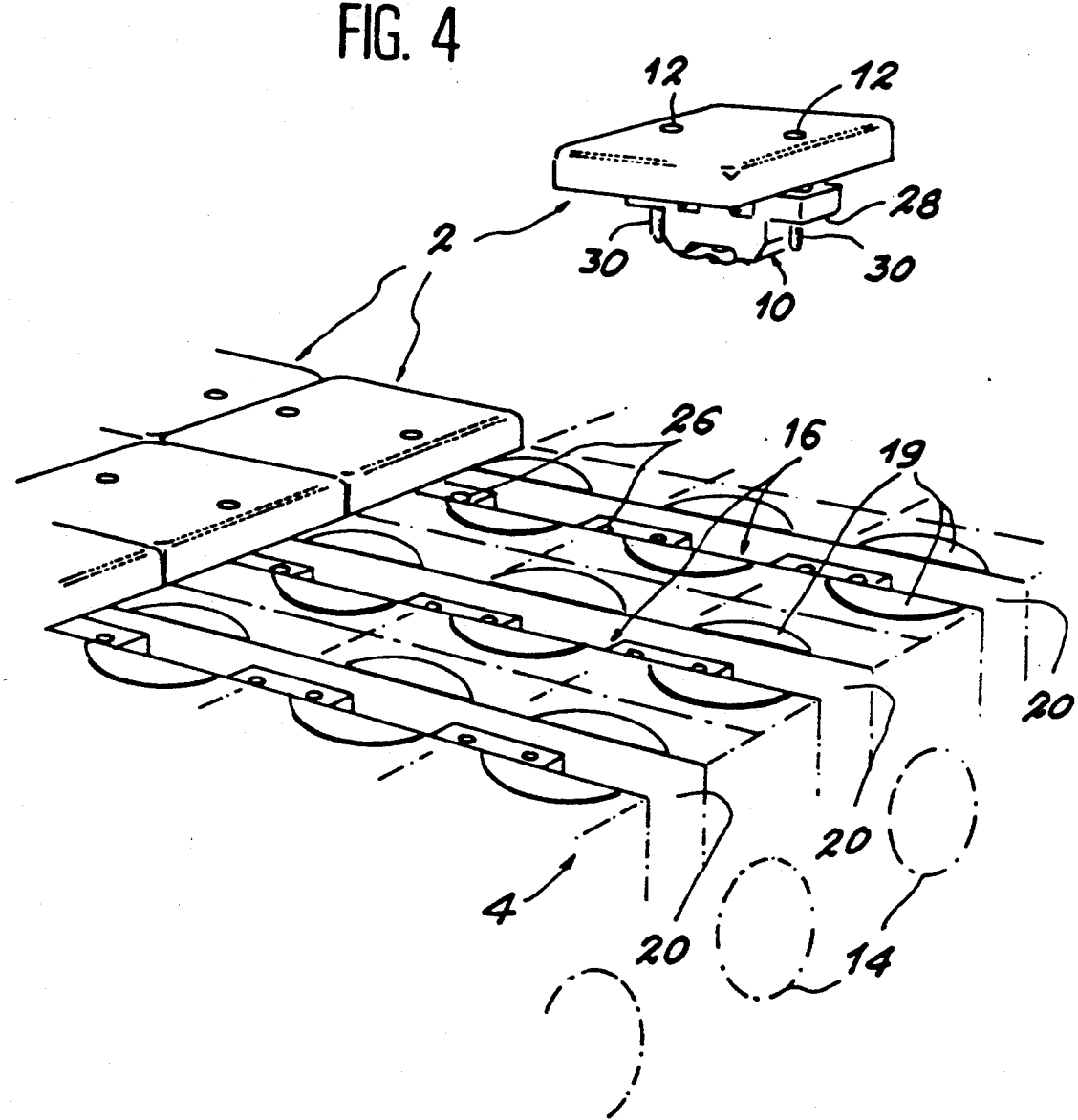

FIG. 4 shows a support structure 4 covering a surface to be protected. It has several longitudinal channels 20, which are parallel to one another and have several series of fixing holes 26, with a view to receiving in each case a series of reciprocally aligned protective tiles 2. Thus, a large surface to be protected can be covered by a heat shield of the type described hereinbefore.

ADVANTAGES OF THE INVENTION

The elastic fixing means according to the invention make it possible to ensure, via a shaping layer, a very good heat transfer by conduction between the tile exposed to an intense thermal flux and the cooled support structure. This makes it possible to limit the temperature on the surface of the protective tiles and increase the life of the shield, because erosion by evaporation is directly dependent on the temperature and the incident thermal flux.

It is pointed out for information purposes that the heat shield described hereinbefore is so dimensioned as to protect a structure from an incident, continuous thermal flux which can reach 100 W/cm² on a graphite tile shaped like a parallelogram of dimensions 12×12×2 cm³. The thickness of the shaping layer 19 is a function of its rigidity and heat conduction. In the above example, it has a thickness of approximately 1 mm. The heat transfer is adequate between each tile and the cooled support structure to limit the tile surface temperature to below 1000° C.

An important advantage of the heat shield according to the invention is that each tile has an independent mechanical connection with the support structure. This concept permits an easy, rapid and, if necessary, automated replacement of each tile independently of its neighbours. Thus, the putting into place and locking of each tile, which takes place via the front face of the shield, requires no rotary or translatory movement of the part and no accessibility via the rear of the support structure.

The shaping layer placed between each tile and the support structure is not exposed to sliding or sheer stresses during installation and only compressive stresses are exerted. The fixing mechanism for each tile is protected from the heat flux and the erosion to which the tile is exposed.

The heat shield according to the invention can be used for the protection of certain components installed in a thermonuclear reactor, where the plasma created in the core emits a very intense thermal radiation.

Industrial equipment, such as furnaces, in which the temperatures of the refractory material components must be limited, can also be equipped with the heat shield according to the invention. It permits a frequent, rapid replacement of each shield element.

The heat shield according to the invention can also be installed on a space vehicle having to reenter the earth's atmosphere.

We claim:

1. A heat shield comprising a support structure made from a heat conducting material and cooled by an internal cooling fluid flow, parallelepipedic protective tiles made from a heat resistant material and affixed to the support structure via elastic fixing means with a shaping layer therebetween, wherein the elastic fixing means comprise for each tile a tie rod fixed at a first end to the rear face of the tile, a plate spring fixed at its center perpendicular to the second end of the tie rod, and a mobile locking arm slidably mounted around the tie rod between the spring and the tile, and having at each end a bearing surface against which respectively abut each of the ends of the plate spring tensioned by a locking means, wherein the locking means comprise at least two locking screws screwed into the support structure and into fixing holes contained within said support structure, said locking screws each having a head which bears on the locking arm at the ends of said arm facing the rear face of the tile, the heads of the locking screws being accessible by the front face of the tile by a small diameter locking orifice.

2. A shield according to claim 1, wherein the support structure has a contact surface having a longitudinal channel containing the fixing holes and for receiving the locking arm and within which the locking arm can be engaged under the action of locking screws in order to act on the spring once the rear face of the tile contacts the conformation layer, the distance in the inoperative state separating the rear face of the tile from the underlying face of each end of the locking arm being less than the depth of the longitudinal channel so as to permit the compression of the spring necessary for the locking of the conformation layer between the tile and the support structure.

3. A shield according to claim 1, wherein the support structure has parallel cooling medium ducts and a longitudinal channel for receiving the locking arm which is parallel to the ducts.

4. A shield according to claim 1, wherein the support structure has parallel cooling medium ducts and a longitudinal channel for receiving the locking arm which is parallel to the ducts.

5. A shield according to claim 2, wherein the support structure has parallel cooling medium ducts and the longitudinal channel is parallel to the ducts.

* * * * *